United States Patent [19]

Gerstenmaier

[11] Patent Number: 4,745,420

[45] Date of Patent: May 17, 1988

[54] METHOD AND APPARATUS FOR CONTROLLING THE SIZE OF DOTS PRODUCED BY JETTING PHASE CHANGE INK

[75] Inventor: Amy Gerstenmaier, Danbury, Conn.

[73] Assignee: Dataproducts Corporation, Woodland Hills, Calif.

[21] Appl. No.: 887,283

[22] Filed: Jul. 21, 1986

[51] Int. Cl.[4] .............................................. G01D 15/16

[52] U.S. Cl. ................................ 346/140; 346/76 PH

[58] Field of Search ............ 346/1.1, 140 PD, 76 PH; 400/120, 641, 662

[56] References Cited

U.S. PATENT DOCUMENTS 4,568,949 2/1986 Murauaka ...................... 346/76 PH

*Primary Examiner*—H. Broome

*Assistant Examiner*—Mark Reinhart

*Attorney, Agent, or Firm*—Woodcock, Washburn, Kurtz, Mackiewicz & Norris

[57] ABSTRACT

A method of ejecting droplets of phase change or hot melt ink jet ink upon a target such as paper includes a step of applying pressure to the droplets after they have cooled upon the paper in order to increase their coverage and, thus, minimize the volume of ink required to produce a high quality print with a high degree of resolution. Including a means for applying pressure to the cooled droplets, a suitable apparatus increases the area of the target covered by a particular droplet after spreading by at least five percent and preferably by twenty percent.

18 Claims, 2 Drawing Sheets

METHOD AND APPARATUS FOR CONTROLLING THE SIZE OF DOTS PRODUCED BY JETTING PHASE CHANGE INK

BACKGROUND OF THE INVENTION

This invention relates to the jetting of ink and, more particularly, the jetting of phase change ink.

The use of phase change ink is particularly desirable since it produces high quality print with a high degree of resolution, e.g., good edge definition and contrast.

Co-pending application Ser. No. 610,627, filed May 16, 1984, discloses a hot melt or phase change ink. The ink is elevated in temperature as it leaves the jet so as to be in the liquid state; upon or shortly after contact with target, the ink solidifies or freezes on the target. Typically, the dot of ink formed by a droplet of phase change ink protrudes from the target such that the dot may be readily discerned by touch with very little spreading of the dot on the surface of the target. Moreover, because of the substantially instant freezing of the droplet on the target, actual penetration of the droplet into the target which may comprise paper is minimized, at least as compared with other ink jet inks which are not of the phase change type.

As a consequence of the substantially instantaneous freezing of the droplet, the lack of spreading of the droplet after contact with the target, multiple droplets of phase change ink may be necessary to form a mark or dot of the desired size on a target. Although this technique, which is described in co-pending applications Ser. No. 453,295, filed Dec. 27, 1982, and Ser. No. 600,875, filed Jan. 23, 1986 as a continuation of Ser. No. 600,785, filed Apr. 16, 1984 and now abandoned, assigned to the assignee of this invention, does produce high quality printing satisfying to the eye, it does require a higher frequency of droplet ejection to achieve the same rate of printing achieved when using an ink which is not of the phase change type. Moreover, a greater volume of phase change ink may be required to achieve the same visual effect which could be achieved with ink of a non-phase change type.

SUMMARY OF THE INVENTION

It is the object of this invention to provide high-speed jetting of phase change ink.

It is a further object of this invention to minimize the volume of phase change ink utilized to achieve a particular visual effect.

In accordance with these and other objects of the invention, phase change ink capable of undergoing a thermally reversible liquid to solid phase transition is heated to a temperature so as to undergo a solid to liquid transition. A small volume of ink is ejected, which may take the form of a droplet, toward a target. When the small volume of ink strikes the target, the temperature of the ink is lowered so as to effect a liquid to solid transition.

In accordance with this invention, pressure is then applied to the volume of ink on the target, after the liquid to solid transition has occurred, so as to spread the dot or mark represented by the volume of ink on the target, thereby modulating the size of the dot or mark.

In accordance with another aspect of the invention, the amount of pressure is controlled so as to control the degree of spreading or modulation.

In the preferred embodiment of the invention, the area of the dot is increased by at least five percent and preferably twenty percent.

In accordance with this invention, the pressure is supplied by compressing the target and the dot or dots on the target. This may be accomplished while advancing the target. Preferably, it is accomplished by one or more rollers which advance the target while compressing the dot or volume of ink on the target. In a particularly preferred embodiment of the invention, the degree of pressure applied by at least one roller is controlled so as to modulate or control the degree of spreading of the dot on the target.

DETAILED DESCRIPTION OF A PREFERRED EMBODIMENT

Figure 1:
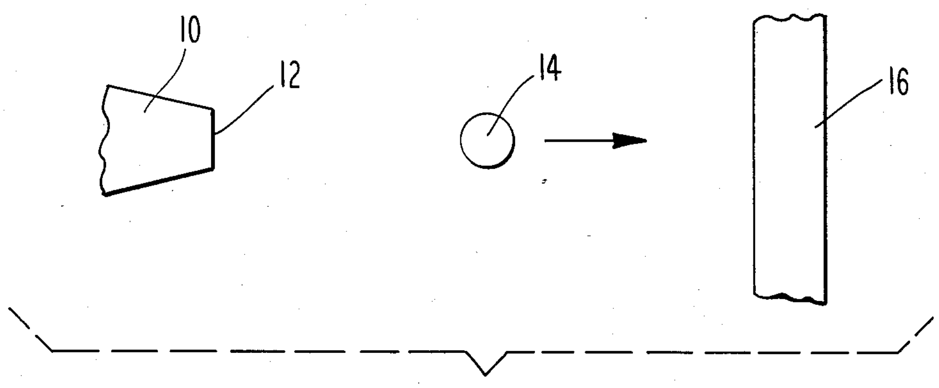
FIGS. 1 through 4 are partially schematic representations of a series of steps in a method of jetting phase change ink in accordance with this invention.

Referring to FIG. 1, ink jet 10 including orifice 12 is shown with a droplet of ink 14 having been ejected toward a target toward a target 16. In the preferred embodiment of the invention, the jet 10 is of the demand type, i.e., the droplet 14 is only ejected in response to the state of energization of a transducer associated with the jet 10 when and only when a droplet is requested or required. As shown, the droplet 14 is essentially spherical in flight as it moves in the direction depicted by the arrow. It will be appreciated that the droplet 14 may be elongated and may take more the form of a ligament. In any event, the droplet 14 has been heated at the jet 10 so as to be in the liquid state while in transit as shown in FIG. 1, having undergone a solid to liquid phase transition.

Figure 2:
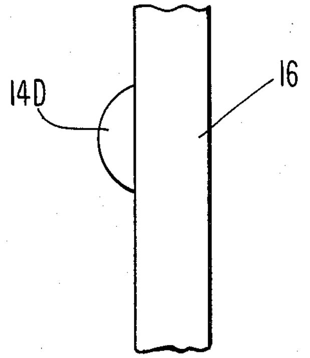

Referring to FIG. 2, a deposited droplet or dot 14D is on the target 16 at or about the time of deposit. As shown, the dot 14D undergoes a liquid to solid phase transition. Note the manner in which the dot 14D protrudes from the target 16.

Figure 3:
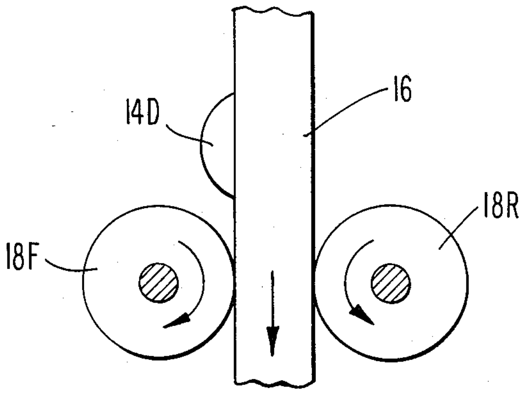

In accordance with this invention, the target 16 and the dot 14D are subjected to pressure as shown in FIG. 3. This pressure is achieved by contacting the target 16 and the dot 14d by a front roller 18F and a rear roller 18R which not only compress the target 16 and the dot 14D but also advance the target 16 in the direction shown by the arrow.

Figure 4:
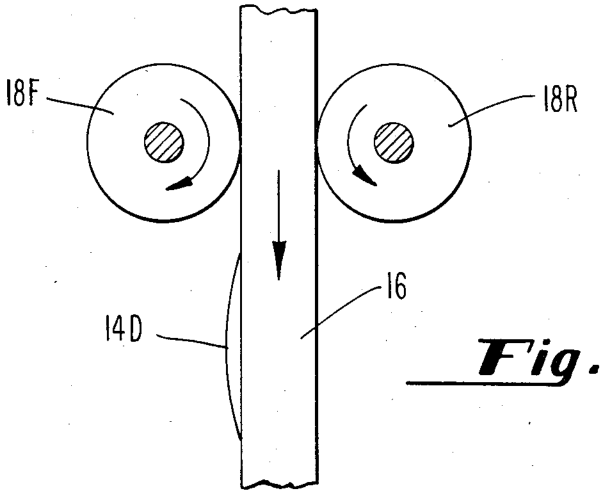

In accordance with this invention, the dot 14D is modulated as a result of the pressure applied by the rollers 18F and 18R as shown in FIG. 4. In particular, it will be seen that the modulated droplet 14M has been spread out over the target 16 so as to have a greater area than shown in FIG. 3 and lesser height or protrusion from the target 16.

Figure 5:
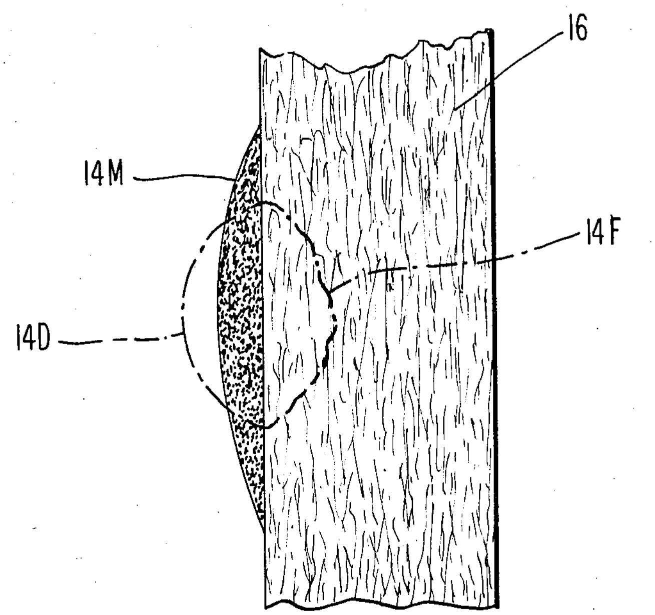
FIG. 5 is a sectional view of a target illustrating the degree of modulation or spreading of a dot achieved in accordance with this invention.

It will of course be appreciated that the target 16 may have been contacted by a plurality of liquid droplets which have undergone a liquid to solid phase transition and the pressure applied by the rollers 18F and 18R is applicable to the entire target 16 and all of the droplets or dots 14 carried by the target. It will also be appreciated that the droplet 14 may actually penetrate the target 16, depending on the nature of the target 16. As shown in FIG. 5, the modulated dot 14M extends along the surface only of the target 16. However, a permeable target, such as paper, will allow the droplet 14 to actually penetrate the target 16 as depicted by the line 14F. In either case, the shape of the dot 14D which extends outwardly from the target 16 prior to modulation or application of pressure has a lesser area overlying the surface of the target 16 than after the modulation or application of pressure, as depicted by the shape of the dot 14M. In accordance with this invention, the application of pressure or modulation increases the target area covered by the dot 14m as compared with the dot 14D by at least five percent and preferably by at least twenty percent.

Figure 6:
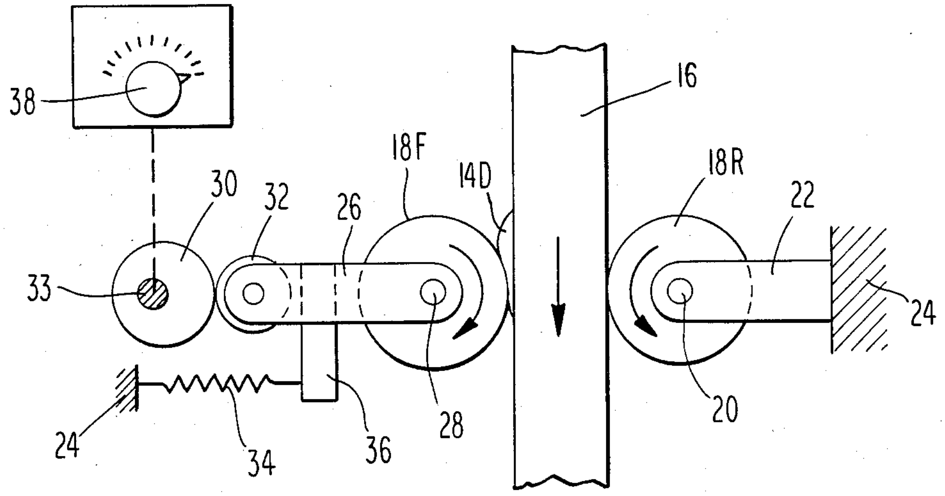
FIG. 6 gives a partially schematic representation of a means for controlling the degree of modulation of the dot on a target.

In accordance with another important aspect of the invention, the amount of pressure applied to the target 16 carrying the dots 14F may be controlled. In other words, the pressure may be increased to increase the spreading of the dots 14M or may be decreased to decrease the spreading of the dots 14M. Reference will now be made to FIG. 6, wherein an apparatus is shown capable of controlling the pressure and thus the modulation of the dot size.

As shown in FIG. 6, a dot 14D is in the process of being modulated or spread by roller 18F at the front of the target 16 while the roller 18R is free to roll but otherwise fixed in place at its axis 20 which extends through support members 22 secured to a frame 24. Support members 26 for the roller 18F are free to move toward or away from target 16 with a resulting movement of the axis 28 for the roller 18F. This is accomplished by means of an eccentric 30 which contacts a roller 32, also attached to the support members 26. As the eccentric 30 is moved about its axis of rotation 32, the roller 32, the support members 26 and the roller 18F will move from left to right and vice versa. As the roller 18F moves to the right, the pressure on the target 16 and the dot 14D is increased. As the roller 18F moves to the left, that same pressure is decreased. A spring 34 connected between the frame 24 and the arm 36 extending from support members 26 maintains the roller 32 in contact with the eccentric 30.

In accordance with this invention, the eccentric 30 may be set by an operator, either directly or indirectly. As shown, a control knob 38 mechanically coupled to the eccentric 30 may be rotated which, in turn, will control the position of the eccentric 30 and the degree of pressure available for modulation of the dot 14D. The coupling between the knob 38 and the eccentric 30 may be a mechanical connection or may be achieved by other electrical or electro-mechanical means capable of controlling the position of the eccentric 30.

It has been found to be particularly surprising that a deposited dot or droplet 14D may be modulated as shown in the subject application with extremely favorable results. More particularly, the modulation achieves a rather uniform spreading of the dot while maintaining good edge definition. Furthermore, the spread dot tends to adhere very well to the target.

Details for a particularly suitable phase change ink are shown in U.S. Pat. No. 4,484,948 and application Ser. No. 610,627, filed May 16, 1984, both of which are assigned to the assignee of this invention and incorporated herein by reference. Details of a demand ink jet well-suited for use with this invention are disclosed in U.S. Pat. No. 4,459,601, application Ser. No. 576,582, filed Feb. 3, 1984; and Ser. No. 384,131, filed June 1, 1982, now U.S. Pat. No. 4,509,059, all of which are assigned to the assignee of this invention and incorporated herein by reference.

Although the use of a demand ink jet apparatus is desirable for depositing the droplets to be modulated, it will be appreciated that another ink jet apparatus may be utilized. For example, a continuous ink jet may be utilized. It will also be appreciated that other apparatus for applying pressure to the target and the deposited droplets may be utilized.

Although a particular embodiment of the invention has been shown and described and various modifications suggested, other modifications and embodiments which will occur to those of ordinary skill in the art which will fall within the true spirit and scope of the invention as set forth in the appended claims.

What is claimed is:

1. In a method of operating a system for jetting ink capable of undergoing a thermally reversible liquid to solid phase transition, including the steps of elevating the temperature of the ink so as to effect a solid-to-liquid phase transition, ejecting a small volume of liquid ink toward a target, striking the target with the volume and lowering the temperature of the ink so as to effect a liquid-to-solid transition, the improvement comprising the step of applying pressure to the volume of ink on the target after said lowering of temperature to spread the volume across the surface of the target.

2. The method of claim 1 including the step of controlling the pressure to control the spreading.

3. The method of claim 1 wherein the area of the target covered by the volume of ink is increased after spreading by at least five percent.

4. The method of claim 3 wherein the area of the target covered by the volume of ink is increased after spreading by at least twenty percent.

5. The method of claim 1 wherein the pressure is applied by compressing the target and the ink.

6. The method of claim 1 including the step of advancing the target while applying pressure.

7. The method of claim 1 including the step of engaging said target between rollers so as to apply said pressure and advance said target.

8. The method of operating a demand ink system for jetting ink capable of undergoing a thermally reversible solid-to-liquid phase transition, including the steps of elevating the temperature of the ink so as to effect a solid-to-liquid transition, ejecting a droplet of ink on demand toward a target, striking the target with the droplet, and lowering the temperature of the ink so as to effect a liquid to solid transition, the improvement comprised in the step of applying pressure to the volume of ink on the target after said lowering of temperature to spread the volume across the surface of the target.

9. The method of claim 8 including the step of controlling the pressure to control the spreading.

10. The method of claim 8 wherein the area of the target covered by the volume of ink is increased after spreading by at lesat five percent.

11. The method of claim 10 wherein the area of the target covered by the volume of ink is increased after spreading by at least twenty percent.

12. The method of claim 8 wherein the pressure is applied by compressing the target and the ink.

13. The method of claim 8 including the step of advancing the target while applying pressure.

14. The method of claim 8 including the step of engaging said target between rollers so as to apply said pressure and advance said target.

15. An apparatus for jetting phase change ink comprising an ink jet including a chamber and an orifice for ejecting droplets therefrom, a means for heating the ink so as to elevate the temperature of the ink for jetting in the liquid state toward a target where the droplets are cooled to the solid state, the improvement comprising means for applying pressure to the cooled droplets to spread the ink on the target.

16. The apparatus of claim 15 wherein said means for applying said pressure is controllable for controlling the amount of spreading.

17. The apparatus of claim 15, wherein said means for applying pressure is capable of advancing the target.

18. The apparatus of claim 15 wherein said means for applying pressure comprises at least one roller adapted to contact the target.

* * * * *